(12) United States Patent
Furihata et al.

(10) Patent No.: US 6,221,989 B1
(45) Date of Patent: Apr. 24, 2001

(54) POLYMERS AND POSITIVE RESIST COMPOSITIONS

(75) Inventors: Tomoyoshi Furihata; Hideto Kato, both of Usui-gun; Satoshi Okazaki, Nakakubiki-gun, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/310,756

(22) Filed: May 13, 1999

(30) Foreign Application Priority Data

May 14, 1998 (JP) .................................................. 10-150557

(51) Int. Cl.$^7$ .................................................. C08F 126/06
(52) U.S. Cl. .................. 526/261; 526/258; 526/286; 526/287; 526/288; 526/313; 526/318
(58) Field of Search ..................................... 526/258, 261, 526/286, 287, 288, 313, 318

(56) References Cited

U.S. PATENT DOCUMENTS 4,493,884 * 1/1985 Nagano et al. ....................... 430/192

FOREIGN PATENT DOCUMENTS 64-77051 * 3/1989 (JP) .
3-225343 * 10/1991 (JP) .
4-69657 * 3/1992 (JP) .

* cited by examiner

*Primary Examiner*—Helen L. Pezzuto
(74) *Attorney, Agent, or Firm*—Millen, White, Zelano & Branigan, P.C.

(57) ABSTRACT

A novel polymer is provided in the form of a novolac resin in which some of the hydrogen atoms of hydroxyl groups are replaced by 1,2-naphthoquinonediazidosulfonyl ester groups, triazinyl groups and optionally, substituted carbonyl or sulfonyl groups. A positive resist composition comprising the polymer has improved sensitivity, resolution and developability in microfabrication as well as improved heat resistance and low-temperature curability in forming interlayer insulating film.

17 Claims, No Drawings

POLYMERS AND POSITIVE RESIST COMPOSITIONS

This invention relates to a novel polymer in the form of a novolac resin in which some of the hydrogen atoms of hydroxyl groups are replaced by specific groups, and a positive resist composition comprising the polymer.

BACKGROUND OF THE INVENTION

Positive working resist compositions based on novolac resins are conventionally employed as interlayer insulating films in various electronic parts. Typically, these positive working novolac resin-base resist compositions for interlayer insulating films undergo thermal condensation at temperatures above 200° C. to form insulating films. Volume shrinkage occurs as the treating temperature rises. As a result, hardness increases, but insulation resistance declines. It is thus generally believed that a temperature of about 250° C. and a time of about 10 hours are appropriate for this treatment.

Further improvements in the performance of electronic parts are desired. If the insulating film-forming step involved in the manufacture of such electronic parts requires a treating temperature above 200° C., there is a possibility that metal layers in electronic parts be oxidized or deteriorated. To avoid any influence on metal layers, there is a desire to have an insulating material which can be briefly cured at lower temperature.

SUMMARY OF THE INVENTION

An object of the invention is to provide a polymer which is formulated into a positive resist composition having an improved sensitivity, resolution and developability in microfabrication and an improved heat resistance and low-temperature heat curability in the formation of interlayer insulating film. Another object is to provide a positive resist composition comprising the polymer.

Regarding a novolac resin having 1,2-naphthoquinonediazidosulfonyl ester groups substituted thereon, we have found that a novolac resin in which some of the hydrogen atoms of hydroxyl groups are replaced by 1,2-naphthoquinonediazidosulfonyl ester groups and some of the hydrogen atoms of the remaining hydroxyl groups are replaced by triazinyl groups, having a weight average molecular weight based on polystyrene of 1,000 to 30,000, has all the functions of an alkali-soluble resin, a photosensitive agent, and a heat-curing agent. This novolac resin affords a resist composition having an improved sensitivity, resolution and developability in microfabrication as well as an improved heat resistance and low-temperature heat curability in the formation of interlayer insulating film. The resist composition comprising the novolac resin is a photosensitive positive working resist composition which is effective in forming insulating layers in various electronic parts.

We have also found that in the above novolac resin having 1,2-naphthoquinonediazidosulfonyl ester groups and triazinyl groups substituted thereon, when some of the hydrogen atoms of the remaining hydroxyl groups in the novolac resin are further replaced by substituted carbonyl or sulfonyl groups, the resist scum left after development is minimized, which ensures to provide a resist composition with a further improved resolution.

DETAILED DESCRIPTION OF THE INVENTION

According to the invention, there is provided a novel polymer in the form of a novolac resin comprising recurring units of the following formula (1), wherein some of the hydrogen atoms of hydroxyl groups are replaced by 1,2-naphthoquinonediazidosulfonyl ester groups and some of the hydrogen atoms of the remaining hydroxyl groups are replaced by triazinyl groups of the following formula (2). The polymer has a weight average molecular weight based on polystyrene of 1,000 to 30,000. This polymer is referred to as a first polymer.

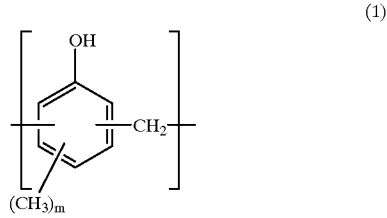

(1)

Herein m is an integer of 0 to 3, preferably an integer of 1 or 2.

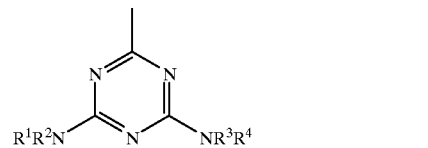

(2)

Herein $R^1$, $R^2$, $R^3$, and $R^4$ are independently hydroxymethyl or —$CH_2OR^5$ groups, at least one of $R^1$, $R^2$, $R^3$, and $R^4$ is a —$CH_2OR^5$ group, and $R^5$ is a straight or branched alkyl group of 1 to 4 carbon atoms. Examples of the alkyl group represented by $R^5$ include methyl, ethyl, propyl, isopropyl, n-butyl, isobutyl, and tert-butyl.

In one preferred embodiment, there is provided a novel polymer in the form of a novolac resin comprising recurring units of formula (1), wherein some of the hydrogen atoms of hydroxyl groups are replaced by 1,2-naphthoquinonediazidosulfonyl ester groups, some of the hydrogen atoms of the remaining hydroxyl groups are replaced by triazinyl groups of formula (2), and some of the hydrogen atoms of the remaining hydroxyl groups are further replaced by functional groups of at least one type selected from groups of the following general formulae (3), (4), and (5). The polymer has a weight average molecular weight based on polystyrene of 1,000 to 30,000. This polymer is referred to as a second polymer.

(3)

(4)

(5)

Herein $R^6$ is a straight, branched or alicyclic alkyl group of 1 to 30 carbon atoms, an aryl group of 6 to 20 carbon atoms, or an aralkyl group of 7 to 20 carbon atoms. Examples of the straight, branched or cyclic alkyl group of 1 to 30 carbon atoms represented by $R^6$ include methyl, ethyl, propyl, isopropyl, n-butyl, isobutyl, tert-butyl, n-pentyl, tert-butylmethyl, n-hexyl, n-heptyl, n-octyl, n-decyl, n-dodecyl, n-hexyl, palmityl, n-stearyl, cyclopropyl, cyclopentyl, cyclohexyl, and cholesteryl. Examples of the aryl group of 6 to 20 carbon atoms include phenyl, tolyl, ethylphenyl, propylphenyl, dimethylphenyl, methylethylphenyl, naphthyl, furyl, and biphenyl. Examples of the aralkyl group of 7 to 20 carbon atoms include benzyl, methylbenzyl, propylbenzyl, and dimethylbenzyl.

In the first polymer, the degree of substitution by 1,2-naphthoquinonediazidosulfonyl ester groups is preferably 0.03 to 0.3 mol, more preferably 0.05 to 0.2 mol, per hydrogen atom of hydroxyl group in the novolac resin. If the degree of substitution by 1,2-naphthoquinonediazidosulfonyl ester groups is less than 0.03 mol, the polymer would become poor in film retention, vague in pattern definition, and thus unsuitable for use as resist compositions. If the degree of substitution by 1,2-naphthoquinonediazidosulfonyl ester groups is more than 0.3 mol, the polymer would become less soluble in solvents and thus difficult to formulate as resist compositions.

Also, the degree of substitution by triazinyl groups of formula (2) is preferably 0.01 to 0.1 mol, more preferably 0.03 to 0.1 mol, per hydrogen atom of hydroxyl group in the novolac resin. If the degree of substitution by triazinyl groups is less than 0.01 mol, the polymer would become less heat-curable, failing to achieve the function of a low-temperature curable insulating film. If the degree of substitution by triazinyl groups is more than 0.1 mol, exposed areas of the polymer would become less soluble in solvents and thus the polymer become difficult to formulate as resist compositions.

In the second polymer, the degree of substitution by functional groups of formula (3), (4) or (5) is preferably 0.01 to 0.8 mol, more preferably 0.02 to 0.6 mol, per hydrogen atom of hydroxyl group in the novolac resin. At a degree of substitution of less than 0.01 mol, such less functional groups would fail to achieve the effect of minimizing resist scum after pattern formation. At a degree of substitution of more than 0.8 mol, exposed areas of the polymer would become less soluble in developer, giving rise to a problem in pattern formation.

The total degree of substitution by 1,2-naphthoquinonediazidosulfonyl ester groups, triazinyl groups, and functional groups of formula (3), (4) or (5) is preferably 0.03 to 0.85 mol, more preferably 0.05 to 0.7 mol, per hydrogen atom of hydroxyl group in the novolac resin. At a total degree of substitution of less than 0.03 mol, unexposed areas would become so soluble in developer that a pattern may not be formed or the pattern, even if formed, may be less heat resistant. At a total degree of substitution of more than 0.85 mol, unexposed areas would become less soluble in developer so that a pattern may not be formed.

The first and second polymers should have a weight average molecular weight based on polystyrene of 1,000 to 30,000, preferably 3,000 to 20,000. If the weight average molecular weight calculated as polystyrene is less than 1,000, the developed film becomes poor in film retention and heat resistance. If the weight average molecular weight is more than 30,000, the resist shows poor resolution and sensitivity.

The first polymer may be prepared by subjecting a novolac resin of formula (1), 1,2-naphthoquinonediazidosulfonyl chloride and 2,4-di (substituted amino)-6-chloro-s-triazine of the following general formula (2a) to dehydrochlorination reaction.

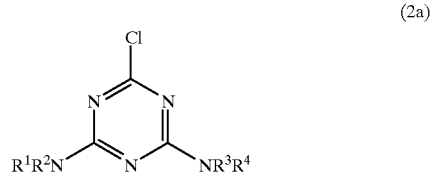

(2a)

Herein, $R^1$, $R^2$, $R^3$, and $R^4$ are independently hydroxymethyl or —$CH_2OR^5$ groups, at least one of $R^1$, $R^2$, $R^3$, and $R^4$ is a —$CH_2OR^5$ group, and $R^5$ is a straight or branched alkyl group of 1 to 4 carbon atoms.

The novolac resin of formula (1) can be prepared by polycondensation of a phenol and an aldehyde in a conventional manner.

Preferred examples of the phenol used herein include m-cresol, p-cresol and mixtures thereof. While the phenol is not limited to these examples, there may be used phenol, various xylenol isomers and trimethylphenol isomers and mixtures thereof.

Formaldehyde is a preferred example of the aldehyde to be polycondensed with the phenol. While the aldehyde is not limited to these examples, there may be used aldehydes having up to 4 carbon atoms such as acetoaldehyde, propylaldehyde, and butylaldehyde and mixtures thereof.

It is preferable to use m-cresol and p-cresol in a molar ratio of from 30/70 to 80/20. A molar ratio of formaldehyde/cresol is preferably from 0.3 to less than 1.0, especially from 0.5 to 0.85 because a F/C ratio of 1.0 or more would invite gelation, resulting in a novolac resin insoluble in resist solvents.

A suitable set of reaction conditions may be selected for the reaction of the novolac resin with 1,2-naphthoquinonediazidosulfonyl chloride and 2,4-di (substituted amino)-6-chloro-s-triazine. It is preferable to effect the reaction at 5 to 50° C. for about 1 to 5 hours in the presence of a solvent such as 1,4-dioxane.

Likewise, the second polymer may be prepared by subjecting a novolac resin of formula (1), 1,2-naphthoquinonediazidosulfonyl chloride, 2,4-di(substituted amino)-6-chloro-s-triazine of formula (2a), and at least one compound of the following general formula (3a), (4a) or (5a) to dehydrochlorination reaction.

(3a)

(4a)

(5a)

Herein $R^6$ is a straight, branched or alicyclic alkyl group of 1 to 30 carbon atoms, an aryl group of 6 to 20 carbon atoms, or an aralkyl group of 7 to 20 carbon atoms, and X is a halogen atom such as chlorine, bromine or iodine.

The polymer of the invention, which is either the first or the second polymer, is useful as a base resin in a positive working resist composition. The invention provides a positive working resist composition comprising the polymer as a base resin and a solvent.

The solvent may be selected from a variety of solvents in which the polymer of the invention is fully soluble and which ensures a film-forming ability. Exemplary solvents are cellosolve solvents such as methyl cellosolve, ethyl cellosolve, methyl cellosolve acetate, and ethyl cellosolve acetate; propylene glycol solvents such as propylene glycol monomethyl ether, propylene glycol monobutyl ether, propylene glycol monomethyl ether acetate, propylene glycol dimethyl ether, and propylene glycol monoethyl ether acetate; ester solvents such as butyl acetate, amyl acetate, methyl lactate, ethyl lactate, ethyl 3-methoxypropionate, ethyl 3-ethoxypropionate; alcohol solvents such as hexanol and diacetone alcohol; ketone solvents such as cyclohexanone and methyl amyl ketone; ether solvents such as methyl phenyl ether and diethylene glycol dimethyl ether; highly polar solvents such as dimethylformamide and N-methyl-pyrrolidone; and mixtures thereof. An appropriate amount of the solvent used is desirably 1 to 20 times, especially 1 to 15 times the total weight of solids (or novolac resin of the invention).

To the resist composition of the invention, small amounts of additives such as dyestuffs, pigments and surfactants may be added if desired.

In forming a resist pattern, the resist composition of the invention is applied to a suitable substrate such as silicon wafer and pre-baked at about 80 to 120° C. for about 50 to 300 seconds to form a resist film of about 0.5 to 20 μm thick. The resist film is exposed to light and developed with a base solution such as an aqueous solution of tetramethylammonium hydroxide or potassium hydroxide, forming a pattern. The pattern can be heat cured by post-baking at about 180 to 250° C. for about 1 to 5 hours, especially at about 180 to 220° C. for about 1 to 3 hours.

There has been described a novel polymer in the form of a novolac resin in which some of the hydrogen atoms of hydroxyl groups are replaced by 1,2-naphthoquinonediazidosulfonyl ester groups, triazinyl groups and optionally, substituted carbonyl or sulfonyl groups. The polymer is effective as a base resin in a positive resist composition. The positive resist composition comprising the polymer has improved sensitivity, resolution and developability in microfabrication as well as improved heat resistance and low-temperature curability in forming interlayer insulating film.

EXAMPLE

Examples of the invention are given below by way of illustration and not by way of limitation.

Synthetic Example 1
Synthesis of novolac resin

A three-necked flask equipped with a stirrer, -condenser, and thermometer was charged with 64.9 g (0.6 mol) of p-cresol, 43.3 g (0.4 mol) of m-cresol, 48.6 g (0.52 mol) of a 37 wt % formaldehyde aqueous solution, and 0.30 g ($2.40 \times 10^{-3}$ mol) of oxalic acid dihydrate as a polycondensation catalyst. While the flask was placed in an oil bath to keep the internal temperature at 100° C., polycondensation was effected for one hour. After the completion of reaction, 500 ml of methyl isobutyl ketone (MIBK) was added to the reaction solution, which was stirred for 30 minutes. With the aqueous layer separated, the product extracted in the MIBK layer was washed 5 times with 300 ml of pure water. After separation, the product was vacuum stripped at 4 mmHg and 150° C. by means of an evaporator, yielding 87 g of novolac resin A.

Synthetic Examples 2–5
Synthesis of novolac resins

Novolac resins B, C, D, and E were synthesized as in Synthetic Example 1. The molar ratio of m-cresol/p-cresol and the molar ratio of formaldehyde/cresol (F/C) are reported in Table 1 together with the weight average molecular weight (Mw) of novolac resins A to D.

TABLE 1

| Synthetic Example | Novolac resin | m-/p-cresol (molar ratio) | F/C (molar ratio) | Mw |
|---|---|---|---|---|
| 1 | A | 40/60 | 0.52 | 3,000 |
| 2 | B | 30/70 | 0.59 | 6,200 |
| 3 | C | 80/20 | 0.85 | 25,000 |
| 4 | D | 50/50 | 0.81 | 40,000 |
| 5 | E | 50/50 | 0.48 | 800 |

It is noted that for the measurement of Mw, a GPC column system (two G-2000H6 tubes, one G-3000H6 tube, and one G-4000H6 tube) by Toso K.K. was used. Measurement was made with eluting solvent THF at a flow rate of 1.5 ml/min and a column temperature of 40° C.

Synthetic Example 6
Synthesis of novolac resin having 1,2-naphthoquinonediazidosulfonyl ester groups and 3,5-(N,N-dimethoxymethyl)amino-2,4,6-triazinyl groups substituted thereon Under light-shielded conditions, a three-necked flask equipped with a stirrer, dropping funnel, condenser, and thermometer was charged with 125 g (1 mol) of novolac resin A obtained in Synthetic Example 1, 67 g (0.25 mol) of 1,2-naphthoquinonediazidosulfonyl chloride, 16.1 g (0.05 mol) of 2,4-bis(methoxymethyl)amino-6-chloro-s-triazine, and 300 g of 1,4-dioxane, which were dissolved by one hour of stirring. After the flask was placed in a water bath adjusted at 25° C., 31.9 g (0.32 mol) of triethylamine was added dropwise such that the internal temperature might not exceed 30° C. After one hour of ripening, the reaction solution was poured into 1,500 ml of 0.1N hydrochloric acid. The resulting precipitate was collected by filtration, dissolved in 800 g of ethyl acetate, washed with water, and separated. Vacuum stripping at 40° C. yielded 190 g of novolac resin A1 in which the hydrogen atoms of hydroxyl groups on novolac resin A were partially replaced by 1,2-naphthoquinonediazidosulfonyl groups (substitution 25 mol %) and 2,4-bis(methoxymethyl)amino-s-triazinyl groups (substitution 5 mol %).

Synthetic Examples 7–10
Synthesis of novolac resins having 1,2-naphthoquinonediazidosulfonyl ester groups and 3,5-(N,N-dimethoxymethyl)amino-2,4,6-triazinyl groups substituted thereon As in Synthetic Example 6, novolac resins B1, C1, D1 and E1 were synthesized in which novolac resins B to E of Synthetic Examples 2 to 5 were substituted with 1,2-naphthoquinonediazidosulfonyl ester groups and 3,5-(N,N-dimethoxymethyl)amino-2,4,6-triazinyl groups.

For these novolac resins, Table 2 reports the starting novolac resins and the degrees of substitution by 1,2- naphthoquinonediazidosulfonyl ester (NQD) groups and 3,5-(N,N-dimethoxymethyl)amino-2,4,6-triazinyl (TRI) groups.

TABLE 2

| Synthetic example | Product novolac resin | Starting novolac resin | NQD substitution (mol %) | TRI substitution (mol %) |
|---|---|---|---|---|
| 6 | A1 | A | 25 | 5 |
| 7 | B1 | B | 10 | 6 |
| 8 | C1 | C | 5 | 4 |
| 9 | D1 | D | 3 | 3 |
| 10 | E1 | E | 25 | 9 |

Synthetic Example 11

Synthesis of novolac resins having 1,2-naphthoquinonediazidosulfonyl ester groups, 3,5-(N,N-dimethoxymethyl)amino-2,4,6-triazinyl groups, and acetyl groups substituted thereon Under light-shielded conditions, a three-necked flask equipped with a stirrer, dropping funnel, condenser, and thermometer was charged with 120 g (1 mol) of novolac resin C obtained in Synthetic Example 3, 67.2 g (0.25 mol) of 1,2-naphthoquinonediazidosulfonyl chloride, 16.1 g (0.05 mol) of 2,4-bis(methoxymethyl)amino-6-chloro-s-triazine, 3.9 g (0.05 mol) of acetyl chloride, and 400 g of acetone, which were dissolved by one hour of stirring. After the flask was placed in a water bath adjusted at 25° C., 31.9 g (0.37 mol) of triethylamine was added dropwise such that the internal temperature might not exceed 30° C. After one hour of ripening, the reaction solution was poured into 5,000 ml of 0.1N hydrochloric acid. The resulting precipitate was collected by filtration, dissolved in 800 g of methyl isobutyl ketone, washed with water, and separated. Vacuum stripping at 40° C. yielded 190 g of novolac resin C2 in which the hydrogen atoms of hydroxyl groups on novolac resin C were partially replaced by 1,2-naphthoquinonediazidosulfonyl ester groups (substitution 25 mol %), 2,4-bis(methoxymethyl)amino-6-chloro-s-triazinyl groups (substitution 5 mol %), and acetyl groups (substitution 5 mol %).

Example 1

In 100 g of propylene glycol monomethyl ether acetate, 50 g of novolac resin A1 was dissolved together with 0.125 g of a surfactant FC-430 (trade name, Sumitomo 3M). The solution was passed through a membrane filter with a pore size of 0.2 μm, obtaining a resist solution.

The resist solution was applied onto a 6-inch bare silicon wafer by means of a spinner and pre-baked on a hot plate at 100° C. for 120 seconds to form a resist film of 3.0 μm thick. The resist film was exposed to light using an i-line stepper NSR-1755i7 (Nikon K.K., NA=0.5), followed by development and rinsing. The resulting pattern was examined. By observing a 50-μm line-and-space pattern under an SEM (Hitachi K.K.), it was examined whether or not side walls of the pattern were perpendicular to the substrate. The resolution was determined by examining whether resist scum was present or absent in spaces.

The resist was also examined for low-temperature curing by a penetration method. To this end, the resist film after development was heat cured by post-baking at 180° C. for 2 hours. Using a thermal mechanical analyzer (Rigaku K.K.), it was observed whether or not a needle penetrated into the film at 200° C.

Additionally, the resist was examined for heat resistance. To this end, the resist film after development was heat cured by post-baking at 180° C. for 2 hours. Using a thermogravimeter (Rigaku K.K.), heat resistance was evaluated in terms of the temperature at a weight loss of 5%.

Examples 2–4 & Comparative Examples 1–2

As in Example 1, the novolac resins of Synthetic Examples 7 to 11 were examined for the perpendicularity of pattern sidewalls, resolution in terms of the presence or absence of resist scum in spaces, low-temperature curing, and heat resistance.

The results are shown in Table 3.

TABLE 3

| Example | Novolac resin | Pattern sidewall perpendicularity and resolution | Low-temperature curing | Heat resistance (temperature at 5% weight loss) |
|---|---|---|---|---|
| E1 | A1 | perpendicular, no scum | not penetrated | 220° C. |
| E2 | B1 | perpendicular, no scum | not penetrated | 230° C. |
| E3 | C1 | perpendicular, no scum | not penetrated | 270° C. |
| E4 | C2 | perpendicular, no scum | not penetrated | 240° C. |
| CE1 | D1 | positive taper, scum | not penetrated | 280° C. |
| CE2 | E1 | positive taper, noticeable thinning | penetrated | 220° C. |

Japanese Patent Application No. 150557/1998 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A polymer in the form of a novolac resin comprising recurring units of the following formula (1):

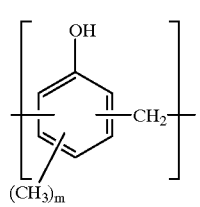

(1)

wherein m is an integer of 0 to 3, wherein some of the hydrogen atoms of hydroxyl groups are replaced by 1,2-naphthoquinonediazidosulfonyl ester groups and some of the hydrogen atoms of the remaining hydroxyl groups are replaced by triazinyl groups of the following formula (2):

(2)

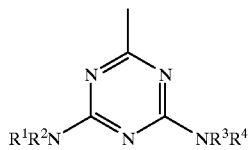

wherein R¹, R², R³, and R⁴ are independently hydroxymethyl or —CH₂OR⁵ groups, at least one of R¹, R², R³, and R⁴ is a —CH₂OR⁵ group, and R⁵ is a straight or branched alkyl group of 1 to 4 carbon atoms, the polymer having a weight average molecular weight based on polystyrene of 1,000 to 30,000.

2. The polymer of claim 1 wherein some of the hydrogen atoms of hydroxyl groups in the novolac resin are replaced by 1,2-naphthoquinonediazidosulfonyl ester groups in a proportion of 0.03 to 0.3 mol per hydrogen atom and some of the hydrogen atoms of the remaining hydroxyl groups are replaced by triazinyl groups of formula (2) in a proportion of 0.01 to 0.1 mol per hydrogen atom.

3. The polymer of claim 1 wherein some of the hydrogen atoms of the remaining hydroxyl groups in the novolac resin are further replaced by functional groups of at least one type selected from groups of the following general formulae (3), (4), and (5):

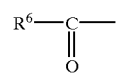
(3)

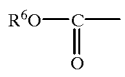
(4)

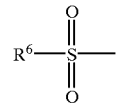
(5)

wherein R⁶ is a straight, branched or alicyclic alkyl group of 1 to 30 carbon atoms, an aryl group of 6 to 20 carbon atoms, or an aralkyl group of 7 to 20 carbon atoms.

4. The polymer of claim 3 wherein the degree of substitution by functional groups of at least one type selected from groups of formulae (3), (4), and (5) is 0.01 to 0.8 mol per hydrogen atom of hydroxyl group in the novolac resin.

5. A positive resist composition comprising the polymer of claim 1.

6. A positive resist composition comprising the polymer of claim 3.

7. The polymer of claim 1, wherein m is an integer of 1 or 2.

8. The polymer of claim 1, wherein R⁵ is methyl, ethyl, propyl, isopropyl, n-butyl, isobutyl, isobutyl, or tert-butyl.

9. The polymer of claim 3, wherein R⁶ is methyl, ethyl, propyl, isopropyl, n-butyl, isobutyl, tert-butyl, n-pentyl, tert-butylmethyl, n-hexyl, n-heptyl, n-octyl, n-decyl, n-dodecyl, n-hexyl, palmityl, n-stearyl, cyclopropyl, cyclopentyl, cyclohexyl, cholesteryl, phenyl, tolyl, ethylphenyl, propylphenyl, dimethylphenyl, methylethylphenyl, naphthyl, furyl, biphenyl, benzyl, methylbenzyl, propylbenzyl, or dimethylbenzyl.

10. The polymer of claim 2, wherein said proportion of 1,2-naphthoquinone-diazidosulfonyl ester groups to hydrogen atoms is 0.05 to 0.2 mol per hydrogen atom.

11. The polymer of claim 2, wherein said proportion of triazinyl groups of formula (2) to hydrogen atoms is 0.03 to 0.1 mol per hydrogen atom.

12. The polymer of claim 4, wherein the degree of substitution by said functional groups is 0.02 to 0.6mol per hydrogen atom of hydroxyl group.

13. The polymer of claim 3, wherein the total degree of substitution by 1,2-naphthoquinone diazidosulfonyl ester groups of formula (3), (4) or (5) is 0.03 to 0.85 mol per hydrogen atom of hydroxyl group in the novolac resin.

14. The polymer of claim 3, wherein the total degree of substitution by 1,2-naphthoquinone diazidosulfonyl ester groups of formula (3), (4) or (5) is 0.05 to 0.7 mol per hydrogen atom of hydroxyl group in the novolac resin.

15. The polymer of claim 1, wherein the polymer has a weight average molecular weight based on polystyrene of 3,000 to 20,000.

16. The polymer of claim 1, wherein m=1, and the CH₃ groups in the repeating units are in the meta position or the para position relative to the OH, or are a mixture thereof.

17. The polymer of claim 15, wherein the molar ratio of m-cresol structures to p-cresol structures is from 30/70 to 80/20.

* * * * *